No. 808,261. PATENTED DEC. 26, 1905.
D. W. STRICKLAND.
LUMBER WAGON.
APPLICATION FILED FEB. 23, 1905.
2 SHEETS—SHEET 1.
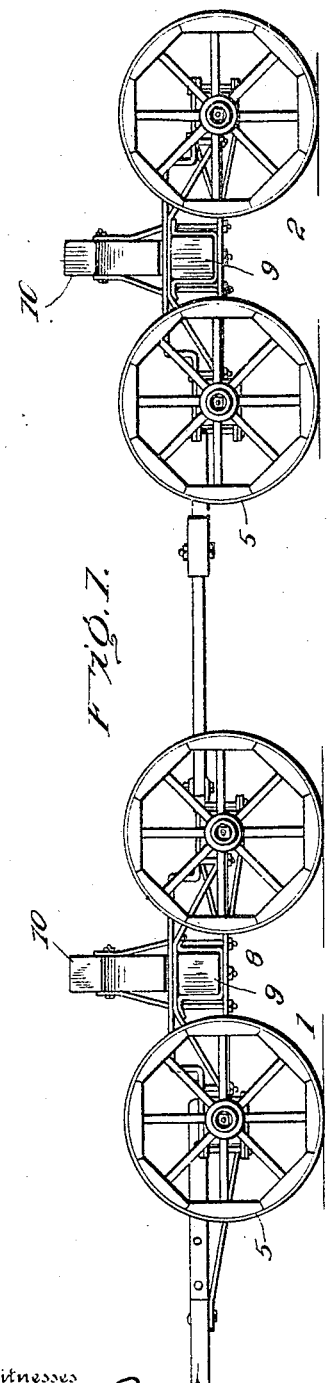
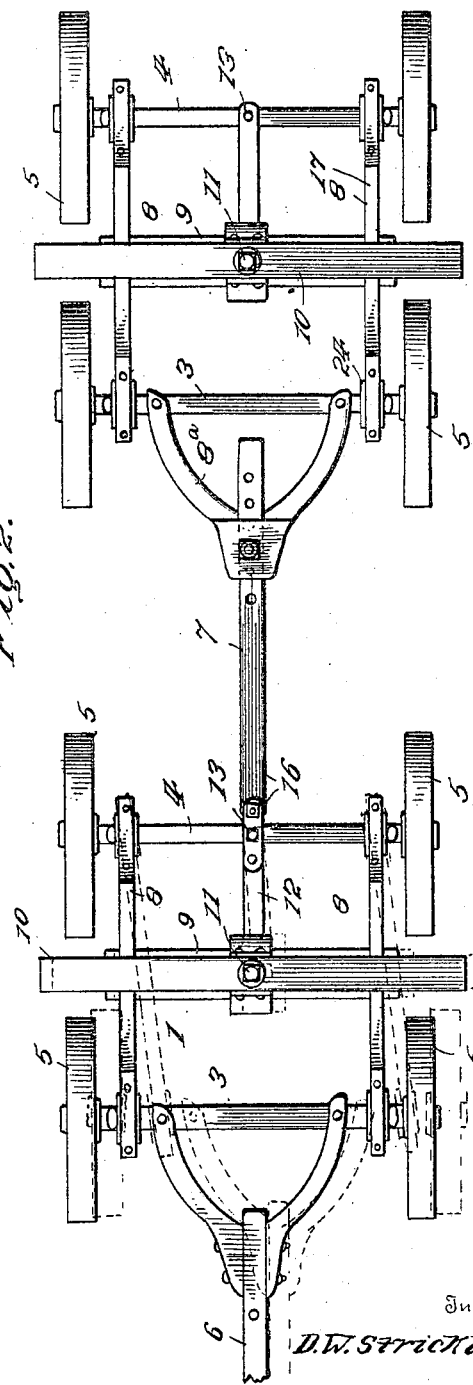
Witnesses
Inventor
D. W. Strickland,
By
Lacey, Attorneys

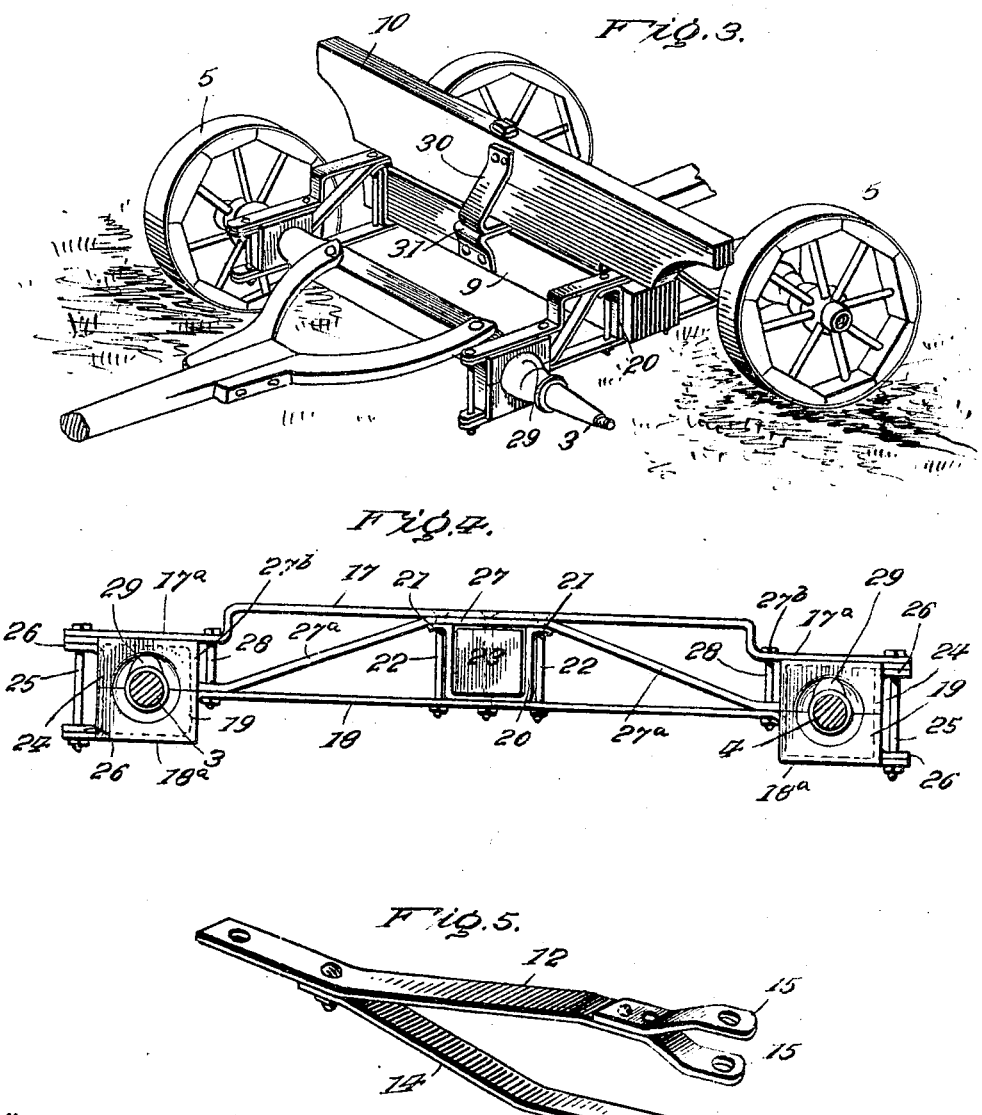

UNITED STATES PATENT OFFICE.

DEWITT W. STRICKLAND, OF MAGNOLIA, MISSISSIPPI.

LUMBER-WAGON.

No. 808,261.      Specification of Letters Patent.      Patented Dec. 26, 1905.

Application filed February 23, 1905. Serial No. 246,962.

*To all whom it may concern:*

Be it known that I, DEWITT W. STRICKLAND, a citizen of the United States, residing at Magnolia, in the county of Pike and State of Mississippi, have invented certain new and useful Improvements in Lumber-Wagons, of which the following is a specification.

This invention relates to improvements in the construction of heavy draft-vehicles such as are commonly used in lumber districts for transporting lumber from one place to another. Vehicles of this type must necessarily be of the greatest substantiality in order to carry the heavy loads which are placed thereon; and it is the essential feature of this invention to increase the strength and rigidity of such venicles to a maximum.

In carrying out the invention the general form of the lumber-wagon is like those now in use, embodying, primarily, a plurality of double trucks suitably connected together and carrying bolsters upon which the lumber is directly supported.

The invention consists in the novel construction of the double trucks of the vehicle, wherein the truck structure is greatly reinforced, as well as the bolsters which are carried thereby, the general substantiality of the vehicle being subserved to the utmost extent in the practical embodiment of the invention.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a side elevation of a lumber-wagon constructed in accordance with the invention. Fig. 2 is a top plan view. Fig. 3 is a perspective view of one of the trucks of the vehicle, a ground-wheel being omitted to bring out more clearly the detail structure thereof. Fig. 4 is a view in elevation showing the structure of one of the longitudinal beams connecting the axles of each truck, the axles being indicated in section. Fig. 5 is a perspective view showing the connecting device between the central portion of the transverse bolster-beam and the rear axle of each truck.

Corresponding and like parts are referred to in the following description and indicated in all the views of the drawings by the same reference characters.

Referring to the drawings and specifically describing the invention, the vehicle illustrated is composed of front and rear double trucks 1 and 2, respectively. Each of the trucks 1 and 2 consists of front and rear axles 3 and 4, respectively, suitable ground-wheels 5 being provided for the axles in the customary manner. The tongue 6 of the vehicle is connected with the front axle 3 of the truck 1 in the usual way, and the double trucks are pivotally connected by means of the reach 7, which is adjustably mounted with relation to the forwardly-extending hounds $8^a$ of the front axle 3 of the rear truck 2. The adjustable connection of the reach 7 with the rear truck 2 admits of increasing or decreasing the distance between the double trucks, a common expedient in vehicles of this type.

As before premised, the invention resides, primarily, in the detail structure of the trucks 1 and 2, and since said trucks are substantially the same in construction only one will be described.

Each truck of the vehicle has front and rear axles 3 and 4, respectively, connected together by means of longitudinal connecting and supporting beams 8. Two of the beams 8 are utilized for each truck and connect the axles 3 and 4 adjacent the ends thereof. The construction of the beams 8 is peculiar, and these beams support at a point between their ends a transverse bolster-supporting beam 9, upon which the bolster 10 is carried. The bolster is secured to its beam 9 by means of a suitable king-bolt 11. The bolster-supporting beam 9 connects the longitudinal beams 8 at a point about intermediate the ends of the latter, and the beam 9 of each truck is entirely carried by the beams 8, above mentioned. A connecting-bar 12 connects the beam 9 of each truck with the rear axle 4, and this bar is secured at its front extremity, preferably by the king-bolt 11, to the beam 9, its rear end being attached directly to the axle 4 by means of a suitable fastening 13. A brace 14 connects with the bar 12 near the front end portion of the latter and extends beneath the rear axle, being secured to the said axle by the fastening 13, above described. The connecting-bar and adjacent members are shown clearly in Fig. 5 of the drawings, and it will be noted that the bar 12 of the front truck 1 has its rearmost extremity bifurcate to form spaced members 15, between which the front extremity of the reach 7 is received and pivotally secured by a bolt or like member.

The longitudinal supporting-beams 8 of the trucks 1 and 2 are of exactly the same formation and comprise, essentially, upper and lower plates 17 and 18, respectively, which are spaced from each other throughout their length, being secured together in a manner now to be described. The end portions of the lower plate 18 of the beams 8 are projected downwardly, as shown at $18^a$, and support brasses 19, forming bearings or boxings, in which end portions of the axles 3 and 4 are mounted. The end portions of the upper plate 17 of each beam 8 also are deflected downwardly, as indicated at $17^a$, and extend above the boxings, which are carried at ends of the beams 8. Between the plates 17 and 18 of each beam and at an intermediate point approximately in the length of these plates is secured a U-shaped member 20, the sides of which have lateral extensions 21 at the upper extremities. Securing-bolts 22 connect the upper and lower plates 17 and 18, respectively, upon opposite sides of the member 20, and these bolts pass through the extensions 21 of said member 20, assisting in positioning the latter in an obvious manner. The members 20 not only brace the beam structure in holding the plates 17 and 18 in spaced relation, but these portions of the beams 8 also receive the ends of the transverse bolster-beam 9, other bolts 23 passing through the ends of the beam 9, the plates 17 and 18, and the member 20, aforesaid, pivotally connecting said beam 9 with the beams 8. The ends of the members 17 and 18 are connected together by vertical end plates 24, provided with lateral extensions 26 at the upper and lower extremities thereof, and suitable fastening-bolts 25 pass through the extensions 26 and the extremities of the plates 17 and 18, rigidly securing said parts together. A brace-plate 27 is secured to the beam 8, the central portion of said plate 27 being disposed between the plate 17, the upper side of the beam 9, and the extensions 21 of the member 20. The several bolts or fastenings 22 and 23 likewise pass through the brace-plate 27 at this portion. The ends of the brace-plate 27 extend diagonally between the plates 17 and 18, as shown at $27^a$, and the extreme end portions of the member 27 extend upwardly, as at $27^b$, and thence horizontally above the uppermost brasses 19 of the boxings, which are carried at the ends of the beam. The members 17, 27, and 18 are connected upon opposite sides of the boxings by means of the bolts 25, which have been before mentioned, and other bolts or fastenings 28, which pass through the members 17, 27, and 18 at a point near the lower extremity of the diagonal portions $27^a$ of the member 27.

It will be noted that the brasses 19 of the boxings of each beam 8 are firmly clamped between the several parts of the beam structure, and in order to prevent lateral displacement of the boxings the brasses 19 are formed at their edges with grooves in which the plates 24 and the end portions of the plates 27 and 18 are received, said parts thus being interlocked virtually, so as to obviate all likelihood of displacement thereof.

The axle-arms of the axles 3 and 4 are received in the boxings in the ends of the beams 8, and the bearings for the axles are sufficiently large to permit a certain amount of lateral play thereof with reference to the beams 8. The axles are provided with lugs or projections 29, which extend upwardly from the end portions thereof adjacent the inner extremities of the axle-arms, and these lugs prevent the boxings at the ends of the beams 8 from sliding downwardly toward the wheels 5, maintaining the beams in connection with the axles 3 and 4 at a point where they are adapted for lateral play, which has just been described. The lateral play afforded by the connections between the axles 3 and 4 is sufficient to permit a certain amount of pivotal movement of the axles with relation to one another, so that the vehicle may gradually turn on a curve. The pivotal movement or play will throw the parts of the truck in relative positions, such as indicated in dotted lines in Fig. 2. Further, the connection afforded by the beams 8, which secure the axles of the respective trucks together, will permit pivotal movement of one axle in a vertical plane independently of its adjacent axle, this being advantageous in passing over obstructions for obvious reasons, since the parts of the trucks of the vehicle have flexible connection with each other, yet are so rigidly connected as to answer the purposes of the invention very effectively.

The longitudinal beams 8, in addition to their function as connecting means for the axles 3 and 4, afford bearings for the end portions of the bolsters 10, which are adapted to connect the upper sides of the plate 17 in the pivotal movement of the bolsters with relation to the trucks 1 and 2. It will thus be seen that the bolster is not only rigidly supported at a point between its ends, but suitable bearings are secured at the extremities of the bolsters, so that the latter are firmly supported both when in line with the transverse beam upon which they are mounted and when they are arranged at an angle thereto, due to pivotal relative movement of the parts of the trucks and said bolsters.

The bolsters 10 and the beam 9 are each provided with bearing-plates 30 and 31, respectively, the former being secured to the bolsters and embracing opposite sides thereof and the latter being similarly mounted upon the members 9. The plates 30 31 are in contact with each other and are so engaged that all friction between the parts 9 and 10 is received by the plates 30 and 31 and the beams 8.

Having thus described the invention, what is claimed as new is—

1. In a lumber-wagon, the combination of double trucks, each of said trucks comprising front and rear axles, ground-wheels at opposite ends of each axle, separate spaced longitudinal beams pivotally connecting the axles of each truck, a transverse bolster-beam pivotally connected with the longitudinal beams of each truck between the ends of the latter, and a bolster mounted upon the bolster-beam.

2. In a lumber-wagon, the combination of double trucks, each of said trucks comprising front and rear axles, spaced longitudinal beams connecting the axles of each truck, a transverse bolster-beam connected with the longitudinal beams of each truck at a point between the ends of the latter, and a bolster pivotally mounted upon the bolster-beams with its ends bearing upon the longitudinal beams.

3. In a lumber-wagon, the combination of connected double trucks, each of said trucks comprising front and rear axles, independent spaced longitudinal beams loosely or flexibly connecting the front and rear axles of each truck, a transverse bolster-supporting beam pivotally connecting the longitudinal beams of each truck, and a bolster carried by each bolster-supporting beam.

4. In a lumber-wagon, the combination of connected double trucks, each of said trucks comprising front and rear axles, spaced longitudinal beams connecting opposite ends of the respective axles of each truck, boxings carried by the ends of the longitudinal beams and receiving the axles of the trucks, said boxings admitting of lateral play of the axles of each truck relative to each other, bolster-supporting beams, and bolsters mounted upon the bolster-supporting beams.

5. In a lumber-wagon, the combination of connected double trucks, each of said trucks comprising front and rear axles, spaced longitudinal beams connecting opposite ends of the respective axles of each truck, boxings carried by the ends of the longitudinal beams and receiving the axles of the trucks, said boxings admitting of lateral and vertical play of the axles of each truck relative to each other, bolster-supporting beams connecting the longitudinal beams of each truck, and bolsters mounted upon the bolster-supporting beams.

6. In a lumber-wagon, the combination of connected double trucks, each of said trucks comprising front and rear axles, longitudinal supporting-beams connecting the axles of each truck, each of said longitudinal beams comprising upper and lower plates, connecting means between the plates of each longitudinal beam, a transverse bolster-beam having its ends mounted between the upper and lower plates of the longitudinal beams of each truck, and bolsters carried by the bolster-supporting beams of each truck.

7. In a lumber-wagon, the combination of connected double trucks, each of said trucks comprising front and rear axles, longitudinal supporting-beams connecting the axles of each truck, each of said longitudinal beams comprising upper and lower plates, connecting means between the plates of each longitudinal beam, a transverse bolster-beam having its ends mounted between the upper and lower plates of the longitudinal beams of each truck, bolsters carried by the bolster-supporting beams of each truck, and boxings clamped between the upper and lower plates of the longitudinal beams and receiving the axles of each truck.

8. In a lumber-wagon, the combination of pivotally-connected double trucks, each of said trucks comprising front and rear axles, longitudinal supporting-beams connecting opposite ends of the axles of each truck, said longitudinal beams comprising superposed plates in spaced relation, boxings clamped between the plates of the longitudinal beams at opposite ends of said beams and receiving the axles with which said beams are connected, transverse bolster-supporting beams having the ends thereof received between the plates of the longitudinal beams of each truck, means for securing the bolster-beams to the longitudinal beams, and bolsters carried by the bolster-supporting beams aforesaid.

In testimony whereof I affix my signature in presence of two witnesses.

DEWITT W. STRICKLAND. [L. S.]

Witnesses:
A. E. STRICKLAND,
L. O. STRICKLAND.